(12) United States Patent
Heyde

(10) Patent No.: US 6,401,650 B1
(45) Date of Patent: Jun. 11, 2002

(54) APPARATUS FOR COATING ARTICLES WITH A LIQUID COATING MATERIAL

(75) Inventor: Hans Heyde, Wallenhorst (DE)

(73) Assignee: Sollich KG, Bad Salzuflen (DE)

( * ) Notice: Subject to any disclaimer, the term of this patent is extended or adjusted under 35 U.S.C. 154(b) by 0 days.

(21) Appl. No.: 09/562,417

(22) Filed: May 1, 2000

(30) Foreign Application Priority Data

May 3, 1999 (DE) .......................................... 199 20 071

(51) Int. Cl.[7] .................................................. A23G 3/20
(52) U.S. Cl. ............................. 118/13; 118/31; 118/70; 118/324; 118/DIG. 4
(58) Field of Search ............................. 118/13, 31, 70, 118/324, DIG. 4; 427/420; 426/306; 134/104.1, 104.3

(56) References Cited

U.S. PATENT DOCUMENTS

| | | | |
|---|---|---|---|
| 5,437,723 A | * | 8/1995 | Sollich ......................... 118/21 |
| 5,728,217 A | * | 3/1998 | Kohno et al. .................. 118/13 |
| 5,954,876 A | | 9/1999 | Koch et al. .................... 113/13 |

* cited by examiner

*Primary Examiner*—Laura Edwards
(74) *Attorney, Agent, or Firm*—Thomas, Kayden, Horstemeyer & Risley LLP (57) ABSTRACT

An apparatus (1) for coating articles (5) includes an endless conveyer belt (4) for transporting the articles (5) to be coated through the apparatus (1). The liquid coating material circulates in a circulation direction in surplus through the apparatus (1) and freely flows in a downward direction to coat the articles (5). A tub (7) includes a run-off plate (9) being located below the endless conveyer belt (4) and being designed and arranged to collect the surplus coating material. A driven unit (17) is designed and arranged to assist the circulation of the surplus coating material being located on the run-off plate (9), and it includes a plurality of doctor blades (18) having lower edges. The doctor blades (18) are arranged above the run-off plate (9), and they extend in a transverse direction with respect to the surface of the run-off plate (9). The lower edges of the doctor blades (18) are designed and arranged to be moved parallel and at a distance with respect to the surface of the run-off plate (9) to contact the surplus coating material being located on the run-off plate (9), and to push it in the circulation direction.

12 Claims, 6 Drawing Sheets

APPARATUS FOR COATING ARTICLES WITH A LIQUID COATING MATERIAL

CROSS REFERENCE TO RELATED APPLICATIONS

This application claims the benefit of co-pending German Patent Application No. 199 20 07-1,8 entitled "Vorrichtung zum Überziehen von Warenstücken, insbesondere Süßwarenstücken, mit einer fließfähigen Überzugsmasse", filed on May 3, 1999.

FIELD OF THE INVENTION

The present invention generally relates to an apparatus for coating articles with a liquid coating material. More particularly, the present invention relates to an apparatus for coating candy bars with tempered chocolate mass as liquid coating material.

BACKGROUND OF THE INVENTION

Apparatuses for coating articles with liquid coating material are commonly known in the art. Apparatuses of this kind are also called coaters. They are used in the production lines of chocolate candy, chocolate bars, fine cakes and pastries and the like to form a coating or a cover over the articles. Often tempered chocolate mass is used as coating material. However, other coating material can be used, for example fats or sugar masses.

An apparatus for coating articles with liquid coating material is known from U.S. Pat. No. 5,954,876. The apparatus includes an endless conveyor belt for transporting the articles to be coated from the entrance toward the exit through said apparatus. The articles lie on said conveyer belt while being coated with the liquid coating material. There are means for coating the articles mounted at least one above the conveyor belt. The liquid of flowable mass is circulated in surplus in the apparatus and falls down in a curtain-like shape in a free downwardly directed descent. A substructure of the apparatus has a housing-like tub including a run-off plate at the bottom to catch the excess coating material being pumped again upwardly for recirculation. The run-off plate is located below said endless conveyor belt and is part of the tub to collect the excess coating material. A scraping belt is arranged below the conveyor belt and above the run-off plate for moving the excess coating material and for scraping the coating material from the run-off plate, wherein the scraping belt includes a plurality of transverse struts. The transverse struts travel immediately above the run-off plate, are rotatably mounted in chains, and can have a circular cross section. The transverse struts always have contact to the surface of the run-off plate to be able to scrap the excess coating material from the run-off plate. The scraping belt is driven continuously. Due to the contact of the scraping belt with the surface of the run-off plate a heat flux at this place cannot be hindered. It is common practice to design the housing-like tub in a double-walled manner and to connect the spacing between the two walls, i.e. the spacing between the outer wall of the tub and the run-off plate, with a protection heating often in form of a circuit of warmed circulating water.

The warmed circulating water has to have a higher temperature than the tempered coating material on the run-off plate to prevent a subcooling and a detempering of the coating material. In case of subcooling there is the danger that the coating material unfortunately gets in solid condition on the run-off plate. On the other hand, especially when coating is effected using chocolate masses, it is important to avoid a heating up to higher temperatures with subsequent detempering. It is not possible to use detempered chocolate masses to coat articles with a good quality of the coating. Using a scraping belt as a unit assisting the recirculation of the surplus coating material on said run-off plate means to have a substantial heat flux into the coating material. On the other hand, the cross section of the struts is smaller than the thickness of the layer of the coating material on the run-off plate. Thus, only part of this layer is contacted by the struts and this makes it necessary to drive the unit containing the struts continuously. This continuous motion mixes a lot of air into the circulating coating material which often is a disadvantage.

The used coating materials of different kind, like chocolate masses, fat or sugar masses or the like, have different characteristics, especially as far as the flow characteristics in the liquid state depending on the temperature of the masses are concerned. Thus, using some of theses masses, it is sufficient to vary the angle of inclination in which the run-off plate is mounted in the apparatus and/or to use gravity forces to circulate the excess of coating material on the run-off plate. Especially when using thixotrop masses or masses having a low fat content it is not possible to use gravity forces only to circulate excess masses in the region of an inlined mounted run-off plate. A driven unit in form of the scraping belt mentioned above is necessary but having the mentioned disadvantages.

In the above described apparatuses it often is desired to use thixotrop masses or masses having a low fat content as coating material while at the same time using a protection warming circuit to avoid a so-called "build-up" of such coating materials on the run-off plate during use in a production line to coat articles like chocolate bars, pralines, waffles, ice cream, sugar products, fine baked goods, snacks or the like.

SUMMARY OF THE INVENTION

Briefly described, the present invention provides an apparatus for coating articles. The apparatus may be especially used with thixotrop masses or masses having a low fat content as coating material. The apparatus may also be applied with a warming water jacket as a warming medium to prevent subcooling of the coating material.

The apparatus for coating articles includes an endless conveyer belt for transporting the articles to be coated through the apparatus. The liquid coating material circulates in a circulation direction in surplus through the apparatus and freely flows in a downward direction to coat the articles. A tub includes a run-off plate being located below the endless conveyer belt and being designed and arranged to collect the surplus coating material. A driven unit is designed and arranged to assist the circulation of the surplus coating material being located on the run-off plate, and it includes a plurality of doctor blades having lower edges. The doctor blades are arranged above the run-off plate, and they extend in a transverse direction with respect to the surface of the run-off plate. The lower edges of the doctor blades are designed and arranged to be moved parallel and at a distance with respect to the surface of the run-off plate to contact the surplus coating material being located on the run-off plate, and to push it in the circulation direction.

The invention is based on the concept that it is not necessary, but often even disadvantageous, even when using thixotrop masses or masses having a low fat content as coating material, to drive the unit in form of the scraping belt continuously. The direct contact of the struts with the surface of the run-off plate guarantees that all of the excess material being on the surface of the run-off plate participates in the circulation immediately. But disadvantageously, the boundary layer of the coating material on the surface of the run-off plate is destroyed continuously. A substantial heat flux and heat transfer is effected from the protection heating of the double jacketed housing and as well from the sliding action of the struts on the surface of the run-off plate into the coating material. This is a great disadvantage for the tempering of the coating material. Furthermore, the incorporation and mixing of air into the coating material varies the characteristics of the coating material in an undesired manner.

According to the present invention it is sufficient to let the unit having the doctor blades penetrate like a shovel or blade intermittently from time to time into the surface region of the coating material on the run-off plate in order to push the coating material stepwise or batchwise. The stepwise pushing of the coating material can be effected by a continuous or an intermediate drive of the unit assisting the recirculation of the surplus coating material on the run-off plate. This stepwise pushing to make the coating material to move even shows the effect that the coating material on the run-off plate remains in motion when the doctor blades have emerged from the coating material. The apparatus includes the novel unit for assisting the recirculation of the surplus coating material on the run-off plate causes a careful stepwise penetration into the coating material. An incorporation of substantial amounts of air is prevented. The heat flux is practically avoided.

It is of general importance that the doctor blades operate without contact to the surface of the run-off plate i.e. not to use a scraping belt as in the prior art. This brings the advantage that according the distance an insulating layer of coating material is build up between the lower edges of the doctor blades and the surface of the run-off plate, the insulating layer hindering the undesired heat flux into the coating material on the surface of the run-off plate. This makes it possible to control the protection heating of the run-off plate with a higher temperature in order to improve the running characteristics of the coating material in the boundary layer on the run-off plate without negatively influencing the tempering conditions of the coating material. The distance of the lower edges of the doctor blades from the surface of the run-off plate can be chosen or adapted to the special masses used and is in the amount of about 2 to 7 mm, especially 5 mm. Such a distance is sufficiently large to let the insulating layer grow. On the other hand, this distance is small enough not to prevent a motion within the insulating layer. Thus, advantageously the entire coating material participates on the circulation.

The doctor blades of the driven unit are moved in a motion path or a path of movement having a rectangular shape. The motion path is composed of a forward stroke, a upward stroke, a backward stroke and a downward stroke. This can be effected by a pneumatic or a mechanical drive being operated continuously or intermittently. Even the cycle of the several strokes can be interrupted by time periods.

The doctor blades of the driven unit should have a width larger than the usual thickness of the surplus coating material on the run-off plate to avoid incorporation of air into the coating material. On the other hand, the entire material contacted by the doctor blades is pushed forwardly on the run-off plate. The doctor blades of the driven unit during the backward stroke completely get free from any contact to the coating material. This is the case with a stepwise drive and a continuous drive also.

A pneumatic drive an be provided for the driven unit assisting the recirculation of the surplus coating material on said run-off plate. The pneumatic drive can have two piston/cylinder units adapted to each other and controlled to effect said motion path having rectangular shape. But it is possible also to provide a mechanic drive for the driven unit assisting the recirculation of the surplus coating material on the run-off plate, the mechanical drive having cam discs.

The driven unit assisting the recirculation of the surplus coating material on the run-off plate can be allocated to a part of the run-off plate or to the run-off plate as a whole.

The doctor blades can be located at an angle of about 30° with respect to the plane of the surface of the runt-off plate. The inclination of the arrangement of the doctor blades is directed away from the run-off plate. Depending on the arrangement of the doctor blades with respect to the surface of the run-off plate during penetration of the doctor blades into the coating material on the run-off plate a slight backward motion of the coating material on the run-off plate can happen due to the inclined arranging of the doctor blades and the adaptation of the movements of the drive of f.e. the two piston/cylinder units. This backward motion is not useless but acts as a loosening action of the coating material at its place on the run-off plate. In this manner the coating material is started to move, especially when using an intermediate drive for the unit. It is evident, that this slight backward motion of the coating material is reversed by the following forward stroke which is longer.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
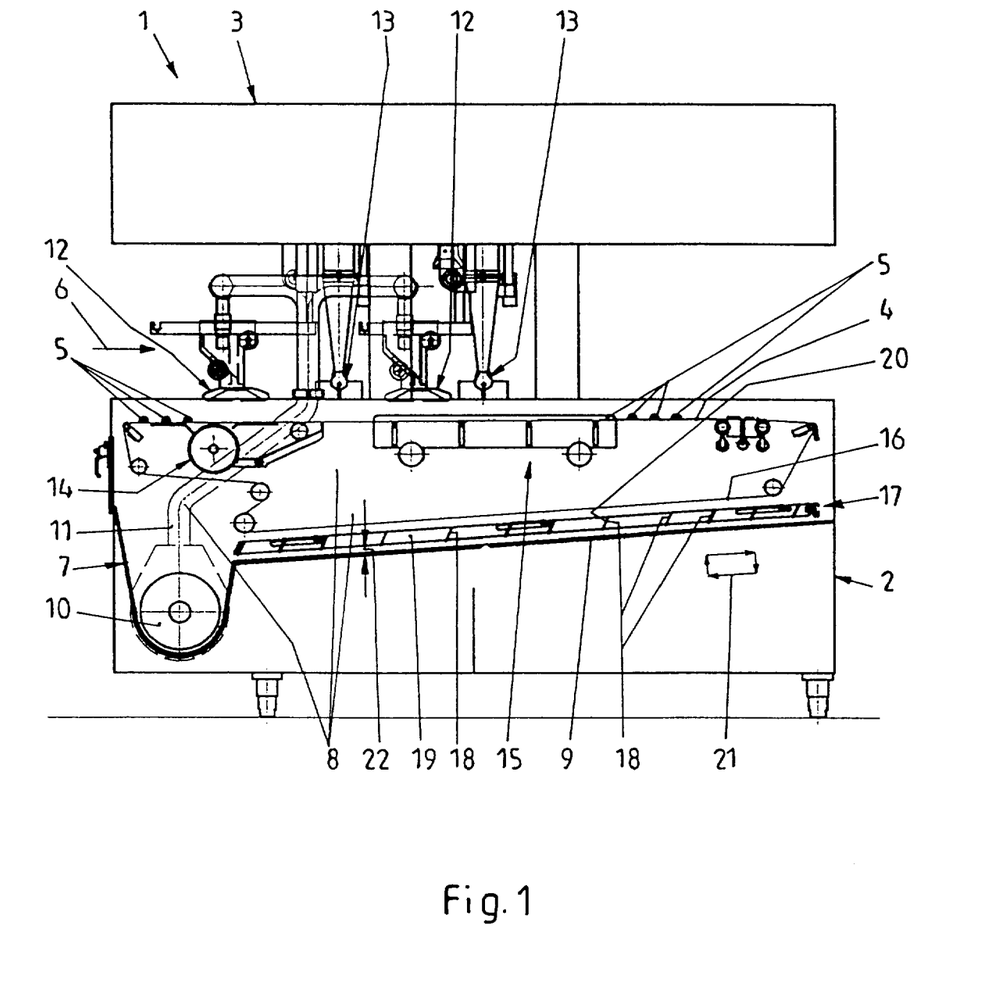
FIG. 1 is a schematic side view of a first embodiment of the apparatus.

Referring now in greater detail to the drawings, FIG. 1 illustrates an apparatus 1 with its essential elements schematically shown. The apparatus or the coater 1 has a table-like substructure 2 and an upper part 3 supported thereon. The substructure 2 includes a wire belt 4 arranged in the interior of the cased substructure 2. The driven wire belt 4 is moved according to arrow 6 over deflection rollers. Articles 5 to be coated are located on the wire belt 4. Generally the wire belt 4 is continuously driven. A tub 7 is arranged in the interior of the substructure 2 in order to collect surplus liquid coating material 8 penetrating the wire belt 4 and dropping off. An inclined run-off plate 9 is the main part of the tub 7. The descending gradient of the run-off plate 9 can vary. In special cases, the run-off plate 9 can be arranged even horizontally. A pump 10 for the circulation of the liquid coating material 8 is positioned in a deepening of the tub 7. The pump 10 delivers the coating material 8 upwardly into a tube 11 ending in a curtain hopper 12. The liquid coating material 8 leaves the curtain hopper 12 in a curtain-like shape in a free downwardly directed descent and thus contacts the articles 5 lying on the wire belt 4. As it is common practice the coater 1 always is operated in a surplus amount of the circulated liquid coating material 8. Thus, a substantial amount of the coating material 8 penetrates the wire belt 4 which often has a stick-like structure, is towed by the wire belt 4 in horizontal direction and drops off the wire belt 4. Most of this dropping coating material 8 is captured by the run-off plate 9. This substantial amount of liquid coating material may be up to 10 metric tons per hour or even more.

A nozzle 13 is arranged following the curtain hopper 12. The nozzle 13 is part of a fan blowing air over the coated articles 5. The air distributes the still liquid part of the coating material on the surface of the articles 5. Thus, the thickness of the coating layer on the articles is reduced and a part of the still liquid material increases the amount of circulated liquid coating material 8.

As illustrated in FIG. 1, it is possible to locate another curtain hopper 12 and a further nozzle 13 in the path of the travel of the articles. Thus, the coater 1 has two coating stations, arranged one behind the other. The coater 1 can have a bottoming roller 14 also enrobing the bottom of the articles with coating material 8. The general construction of such coaters is well known in the art. A shaker grid 15 can be provided below the upper part of the wire belt 4 transferring the articles 5.

A unit 17 assisting the recirculation of surplus coating material on the run-off plate 9 is located above the run-off plate 9 and below the lower running back part 16 of the wire belt 4. Doctor blades 18 are the essential elements of the unit 17. The doctor blades 18 are suspended on longitudinally extending support bars 19 in a gridlike sequence. The support bars 19 extend over the entire length of the unit 17. The doctor blades 18 show a main extending plane 20 positioned substantially transverse with respect to the run-off plate 9. As to be seen from the drawing the doctor blades 18 are positioned with an angle of 30° to the vertical direction and inclined backwardly with respect to the run-off plate 9. The doctor blades 18 are moved in a motion path 21 of substantially rectangular shape. The motion path 21 is composed from a forward stroke, an upward stroke, a backward stroke, and a downward stroke. It is important that the doctor blades 18 supported by the longitudinal support bars 19 even during the forward stroke, i.e. being in the let down position, are positioned and guided with a distance 22 to the upper surface of the run-off plate 9. Thus, the doctor blades act without contact to the surface of the run-off plate 9. Subsequently, an isolating layer is formed between the upper surface of the run-off plate 9 and the lower rims of the doctor blades 18. It is possible to move the unit in a stepwise or batchwise motion and thus to grip into the layer of the surplus coating material 8 in a careful way and without introducing air into the liquid material. The material on the run-off plate 9 is pushed stepwise in the direction of the inclination of the run-off plate to recirculate the liquid tempered material back to the pump 10 and again and again in the circulation circuit.

Figure 2:
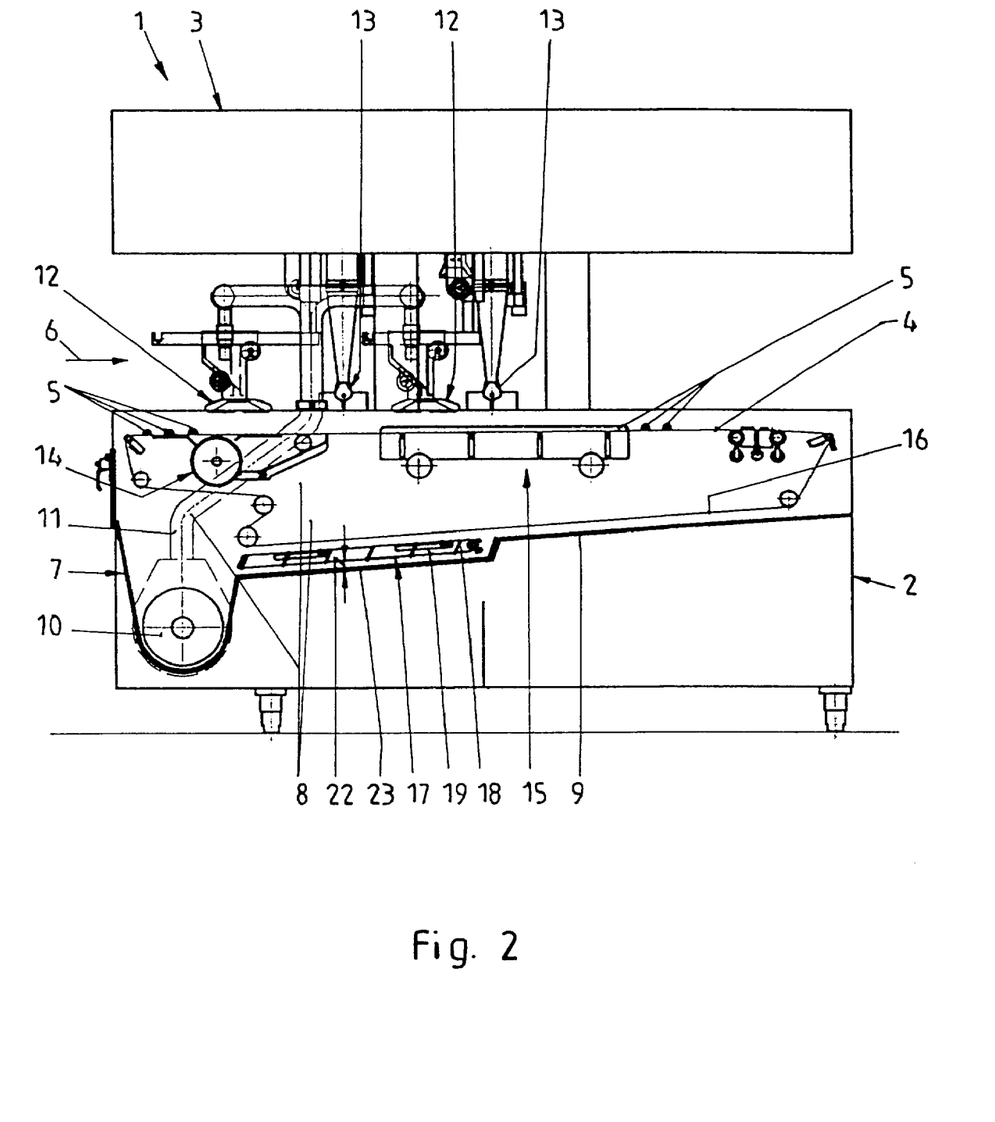
FIG. 2 is a schematic side view of a coater similar to the embodiment of FIG. 1.

The unit 17 with the doctor blades 18 illustrated in FIG. 1 extends over the entire length of the run-off plate 9. FIG. 2 shows a coater 1 very similar to the embodiment of FIG. 1 except that the unit 17 having the doctor blades 18 is allocated only to a part of the run-off plate 9. The un-off plate 9 has a deepening 23 in which the unit 17 is positioned.

Figure 3:
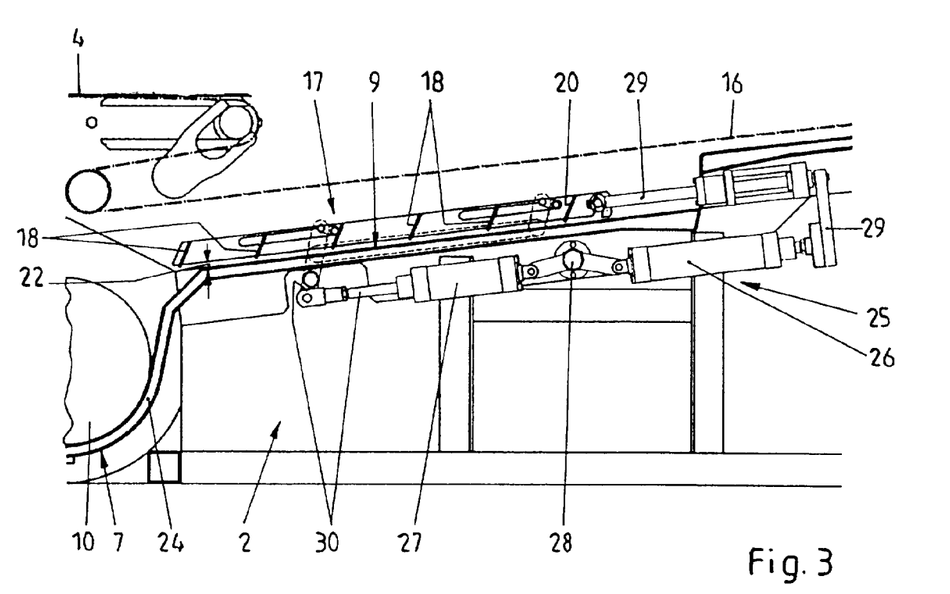
FIG. 3 is a detail of the coater of FIG. 2 in enlarged scale at the end of the forward stroke.

The detailed construction and design of the unit 17 allocated to the run-off plate 9 shown in FIG. 2 is explained in enlarged scale in FIGS. 3 to 6. FIGS. 3 to 6 illustrate several stages of motion path 21. FIG. 3 shows a position with the elements being at the end of the forward stroke of the motion path 21. It can be recognised that the tub 7 has a double-walled design and this is the case also in the region of the run-off plate 9. The thus formed spacing 24 is connected with a heating circuit of warm water. It is the purpose of this protection heating to generate such a temperature at the surface of the run-off plate 9 which is useful and necessary to let flow down the liquid coating material. The doctor blades 18 operate without contact to the run-off plate 9 due to the distance 22 of the forward stroke of the unit 17 which is in the range of 2 to 6 mm. On the other hand there is no substantial mixing of the coating material 8 on the run-off plate 9 by this forward pushing. Thus, the unit 17 does not introduce substantial air into the coating material 8. Advantageously the insulating layer of the coating material 8 on the run-off plate 9 generated according the distance 22 hinders the heat flux from the higher level in the spacing 24 into the coating material 8. Thus, the tempering status of the coating material 8 is not negatively influenced.

A pneumatic drive 25 is provided to move the unit 17 having the doctor blades 18 in the motion path 21. Essential parts of the pneumatic drive 25 are a first piston/cylinder unit 26 and a second piston/cylinder unit 27. A bearing 28 positioned on the substructure 2 supports the piston/cylinder units 26 and 27 and has linkages 29 and 30 respectively giving connection to the unit 17 and their longitudinal support bars 19 respectively via corresponding bearings and guidings. The linkages can contain pivoted levers also being provide on the substructure 2. The pneumatic drive 25 and the two piston/cylinder units 26 and 27 are controlled by a common control device (not illustrated) adapted to move the unit according the motion path 21 (FIG. 1) in the four strokes.

Figure 4:
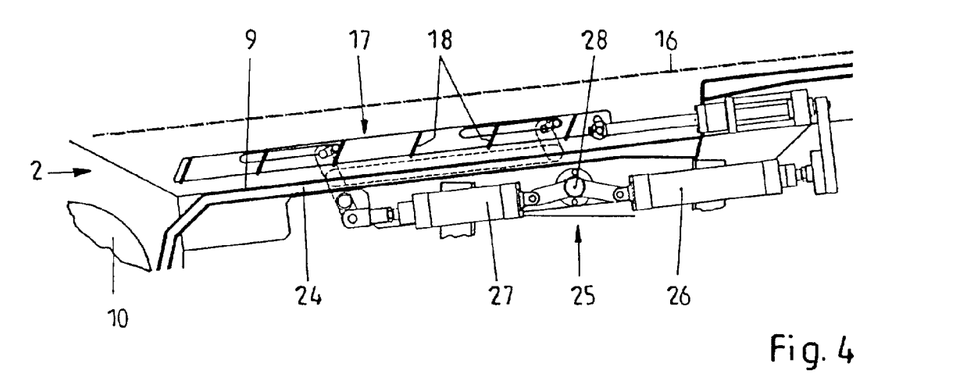
FIG. 4 is a detail of the coater of FIG. 2 in enlarged scale at the end of the upward stroke.
Figure 5:
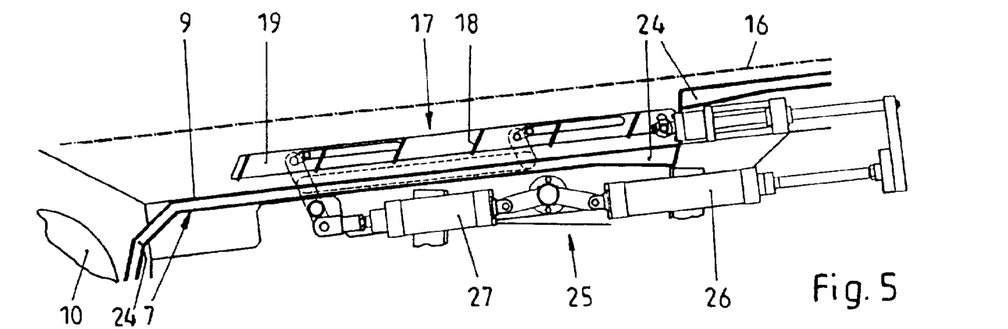
FIG. 5 is a detail of the coater of FIG. 2 in enlarged scale at the end of the backward stroke.
Figure 6:
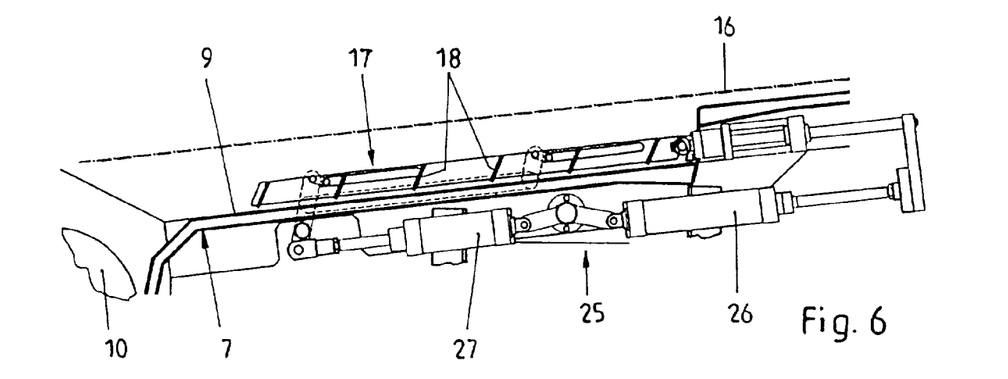
FIG. 6 is a detail of the coater of FIG. 2 in enlarged scale at the end of the downward stroke.

Comparing FIGS. 3 and 4 shows that the piston and cylinder unit 26 has not been moved while the piston and cylinder unit 27 has been actuated to lift the unit 17 away from the run-off plate 9. Thus, the distance 22 has been enlarged to an extent that the lower edges of the doctor blades 18 emerge from the coating material 8 on the run-off plate 9. In this position the backward stroke of the motion path 21 of the unit 17 occurs. The end position of this backward stroke is illustrated in FIG. 5. This means, that during this motion piston/cylinder unit 26 has been actuated while piston/cylinder unit 27 has not been moved. Finally, FIG. 6 shows the lowered position of the unit 17 having the doctor blades 18 immersed onto the coating material 8. So the motion path 21 is completed. During the lowering motion the doctor blades 18 penetrate the coating material 8 on the run-off plate 9. Another cycle of the four strokes can be followed immediately after the end of the downward stroke or after an intermediate time period of rest. A slight backward motion of the coating material 8 on the run-off plate 9 can happen due to the inclined arranging of the doctor blades 18 in an angle of about 30° and the adaptation of the movements of the two piston cylinder units 26 and 27. This backward motion is not useless but acts as a loosening action of the coating material 8 at its place on the run-off plate 9. In this manner the coating material 8 is started to move, especially when using an intermediate drive for the unit 17. It is evident, that this slight backward motion of the coating material 8 is reversed by the following forward stroke.

Figure 7:
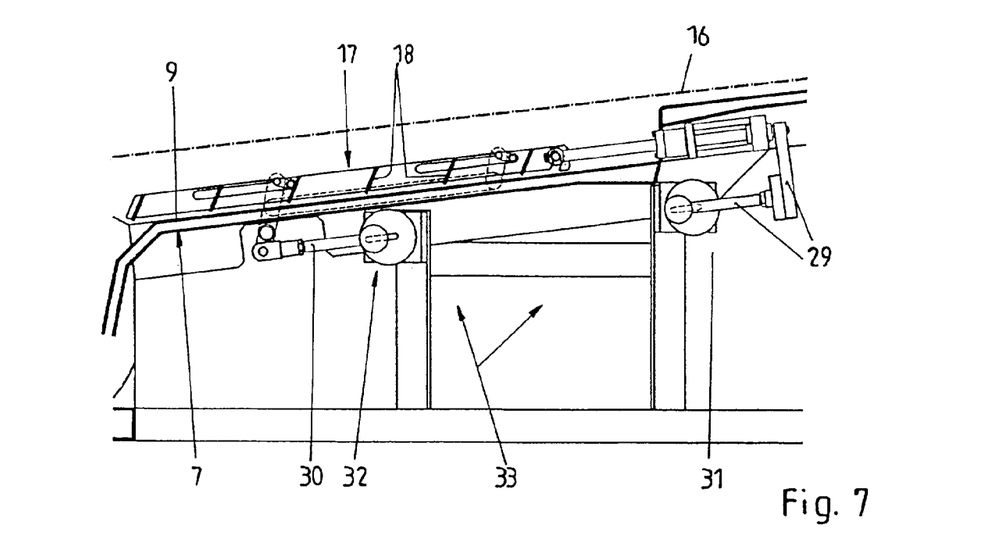
FIG. 7 is a schematic side view of a further embodiment of the coater of the present invention.
Figure 8:
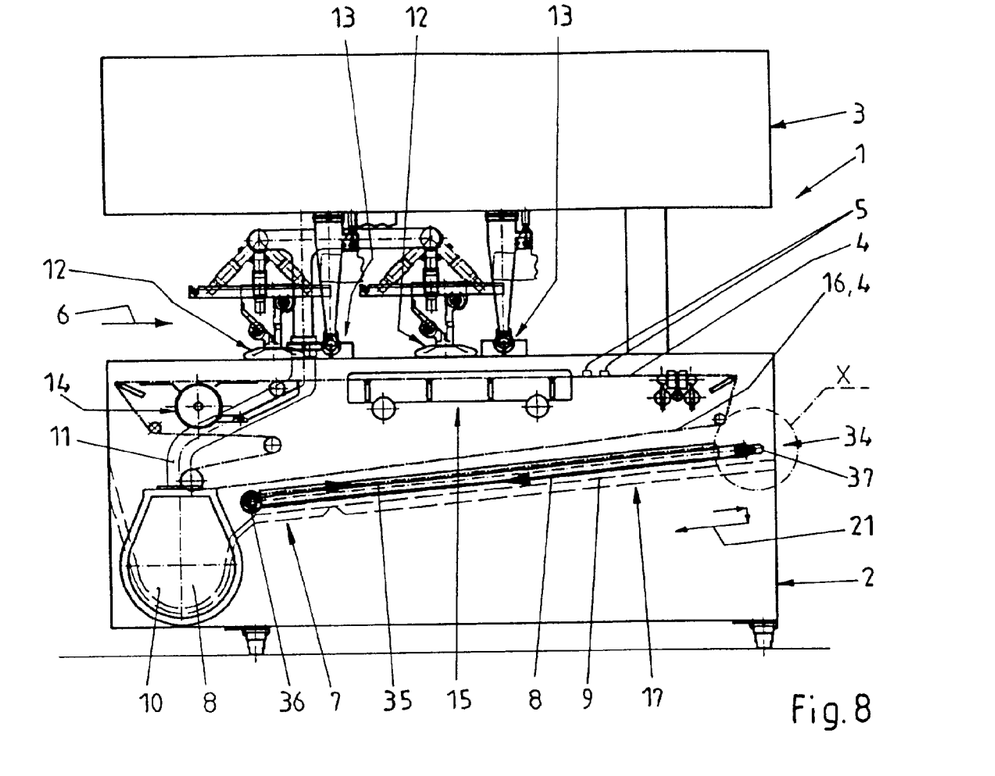
FIG. 8 is a schematic side view of a further embodiment of the coater of the present invention.
Figure 9:
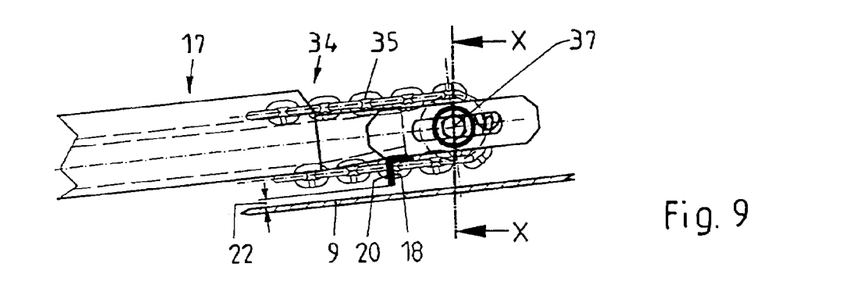
FIG. 9 is a detail of the coater of FIG. 8 in enlarged scale.
Figure 10:
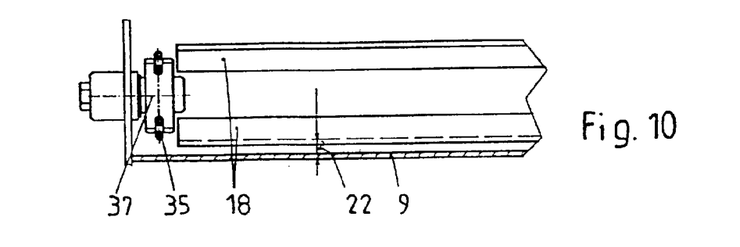
FIG. 10 is a sectional view of the coater of FIG. 8 along the lines X—X of FIG.8.
Figure 11:
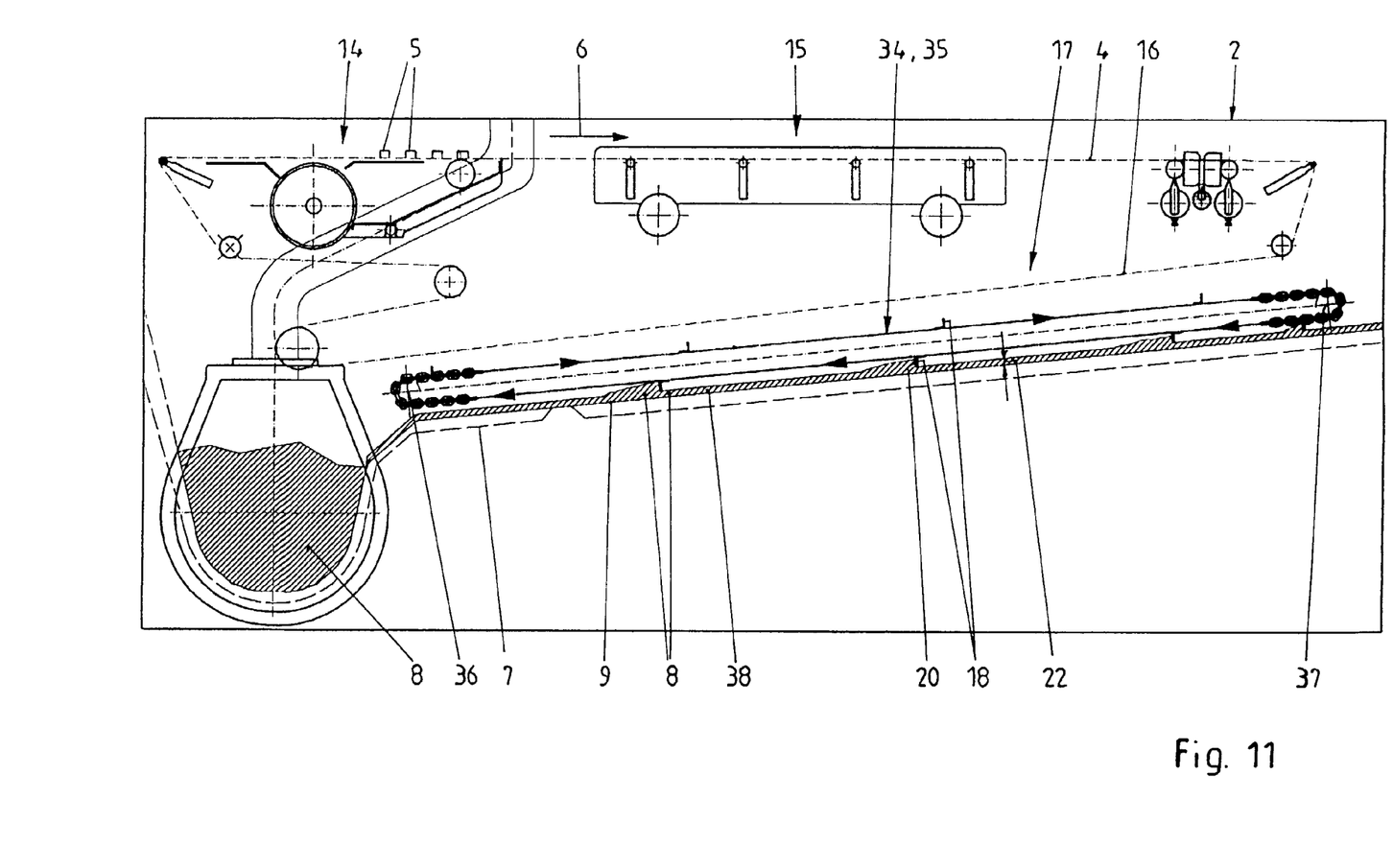
FIG. 11 is a detail illustrating the substructure of the coater of FIG. 8.

FIG. 7 illustrates a mechanically designed drive 33 for the doctor blades 18. The drive 33 has two eccentric or cam discs 31 and 32 adapted to each other and being connected with the linkages 29 and 30 respectively.

FIGS. 8 to 11 illustrate a further embodiment of the coater 1. The general design is similar to the embodiment of FIG. 1. Reference is made to the description above. Only the unit 17 assisting the recirculation of surplus coating material 8 on the run-off plate 9 differs from the embodiment of FIG. 1. The unit 17 has a chain arrangement 34 with two chains 35 arranged on the longitudinal sides of the run-off plate 9 guided by deflection rollers 36 and 37. The chain arrangement 34 is driven continuously or intermittently. The doctor blades 18 here having an angular cross section extend between the two chains 35. The unit 17 and the doctor blades 18 are supported and guided in a manner so that the lower edges of the doctor blades 18 always keep the distance 22 with respect to the upper surface of the run-off plate 9. In this respect reference is made to FIG. 11. An insulating layer 38 is formed from the coating material 8 between the free edges of the doctor blades 18 and the surface of the run-off plate 9. The thickness of the insulating layer 38 corresponds to the distance 22 which preferably is 5 mm. But it is pointed out that at least parts of the insulating layer 38 participate of the conveying so that this part of the coating material 8 is also in the circulation motion but having a lower speed compared with other parts of the coating material 8 directly pushed by the doctor blades 18. Depending on the choice of the distance 22 the thickness of the insulating layer 38 and the boundary film and the speed can be influenced to which parts of the coating material 8 participate in the circulation motion. Here also, as it is common practice the spacing between the housing-like tub 7 and the run-off plate 9 is connected with a protection heating circuit (not illustrated). The undesired heat flux into the coating material 8 is reduced by the choice of the distance 22 and the adjustment of the boundary layer of the insulating layer 38.

Many variations and modifications may be made to the preferred embodiments of the invention without departing substantially from the spirit and principles of the invention. All such modifications and variations are intended to be included herein within the scope of the present invention as defined by the following claims.

I claim:

1. An apparatus for coating articles with a liquid coating material, comprising:

an endless conveyer belt for transporting the articles to be coated through said apparatus;

a curtain hopper device being designed and arranged to provide the liquid coating material in a way to freely flow in a downward direction to coat the articles and to circulate in surplus through said apparatus in a circulation direction;

a tub including a run-off plate being located below said endless conveyer belt and being designed and arranged to collect the surplus coating material; and a driven unit being designed and arranged to assist the circulation of the surplus coating material being located on said run-off plate and including a plurality of doctor blades having lower edges, said doctor blades being arranged above said run-off plate and extending in a transverse direction with respect to the surface of said run-off plate, the lower edges of said doctor blades being designed and arranged to be moved parallel and at a distance with respect to the surface of said run-off plate to contact the surplus coating material being located on said run-off plate and to push it in the circulation direction.

2. The apparatus of claim 1, wherein said doctor blades are designed and arranged to be moved along a path of movement having a rectangular shape and including a forward stroke, an upward stroke, a backward stroke and a downward stroke.

3. The apparatus of claim 1, wherein the lower edges of said doctor blades are arranged at a distance of approximately 2 to 7 mm with respect to the surface of said run-off plate.

4. The apparatus of claim 1, wherein the lower edges of said doctor blades are arranged at a distance of approximately 5 mm with respect to the surface of said run-off plate.

5. The apparatus of claim 2, wherein said doctor blades are designed and arranged to be moved continuously.

6. The apparatus of claim 2, wherein said doctor blades are designed and arranged to be moved discontinuously.

7. The apparatus of claim 1, wherein said doctor blades have a width and the surplus coating material being located on said run-off plate has a thickness, and wherein the width of said doctor blades is more than the thickness of the surplus coating material being located on said run-off plate.

8. The apparatus of claim 2, wherein said doctor blades are designed and arranged to get completely free from contact to the coating material during the backward stroke.

9. The apparatus of claim 2, further comprising a pneumatic drive being designed and arranged to drive said driven unit and including two piston and cylinder units being associated with one another and being controllable to effect the path of movement.

10. The apparatus of claim 1 further comprising a mechanical drive being designed and arranged to drive said driven unit and including a plurality of cam discs.

11. The apparatus of claim 1, wherein said driven unit only partly covers said run-off plate.

12. The apparatus of claim 1, wherein said doctor blades are located at an angle of approximately 30° with respect to the plane of the surface of the run-off plate.

\* \* \* \* \*